FIG. 1a

INVENTORS
R.D. MC COY
F.T. OGLE
BY Young & Quigg
ATTORNEYS

United States Patent Office 3,475,392
Patented Oct. 28, 1969

3,475,392
PROCESS CONTROL SYSTEM FOR MAINTAINING CONSTANT POLYMERIZATION CONDITIONS
Raymond D. McCoy and Frank T. Ogle, Bartlesville, Okla., assignors to Phillips Petroleum Company, a corporation of Delaware
Filed Sept. 23, 1963, Ser. No. 310,729
Int. Cl. C08f 1/09, 3/04
U.S. Cl. 260—83.7
16 Claims

ABSTRACT OF THE DISCLOSURE

Signals representative of flow rates and selected component concentrations are continually established for a plurality of feed streams which are to be blended. These signals are combined to produce signals representative of the total flow rate of each selected component in all of the feed streams. The flow rate of each of the feed streams can be manipulated to maintain a desired concentration in the blended stream of the selected component for which the respective feed stream is the primary source. In the application of this system to the polymerization of butadiene and styrene, impurities which affect the percent reaction conversion can be measured in the feed streams, and the flow rate of the activator and oxidant feed streams can be manipulated on a predictive basis to achieve a desired conversion.

---

The invention relates to improved method and apparatus for controlling a process. In one aspect the invention relates to novel method and apparatus for regulating a plurality of feed streams to a process. In another aspect the invention realtes to method and apparatus for regulating a process to maintain a predetermined desired percentage of conversion of reactant to product. In yet another aspect the invention relates to the regulation of a polymerization process to maintain a desired value of percentage of conversion of monomer to polymer. In still another aspect the inventon relates to a process for producing butadiene-styrene rubbers. In another aspect the invention relates to improved method and apparatus for producing rubber having a desired Mooney.

While the invention is applicable to numerous systems, for purposes of illustration it will be described in terms of a process for producing butadiene-styrene rubber by emulsion copolymerization.

The control of Mooney and monomer conversion represent the problem areas of primary concern in the production of latex. Control items of secondary importance, which infrequently become major control problems, are the rate of reaction, polymer bound styrene content, and polymer soap content. The latter is normally expressed as percent organic acid, since upon coagulation the soap is converted to organic acid.

The control of monomer conversion within prescribed limits is important because variations in conversion are reflected in the resultant Mooney. Also, exceeding the prescribed conversion limits in the production of high Mooney polymer can result in the formation of polymer gel which has a derimental effect on polymer processability. Variations from specified conversion limits change the ratio of organic acid to rubber. The occurrence of extreme variations can result in the production of off-specification material. For intsance, the specification limits which are generally used in a conventional system are plus or minus 3 percent from desired conversion level while the variation experienced in such a conventional system is plus or minus 6 percent.

The chief deterrents to good conversion control are variations in reaction rate. These variations are attributed primarily to impurities in the charge streams, partcularly oxygen and butylenes in the butadiene feed stream. These impurities act as either inhibitors or retarders, inhibitors being impurities which cause induction period in the polymerization process and retarders being impurities which slow the rate of reaction during the entire course of polymerization. With regard to inhibitors, the induction period is that intervals of time between the time all ingredients have been charged to the reactor and the time polymerization starts. In general the induction period can range from a negligible duration to periods up to or exceeding two hours. Oxygen and tertiary butyl-catechol are significant inhibitors which often caused induction periods of up to two hours. Butadiene dimer and butylenes are examples of retarders.

In a conventional system the primary compensation for variations in a reaction rate is effected by varying the polymerization residence time. This can be accomplished by changing the number of reactors and displacement tubes in the train, the tubes in effect being small size reactors located downstream of the primary reactors. A secondary compensation is effected by varying the amount of initiator (catalyst) charged to the first reactor. Previously it has been customary to obtain knowledge as to the monomer conversion through laboratory tests which are performed periodically, for example, hourly. However, difficulty is encountered in the use of such infrequent laboratory tests because of the rapid and frequent changes in reaction rate and the lengthy total reaction time. Thus, one particular conventional system required a change in the train length on the order to 5 to 10 times a day.

The attainment of optimum control would be considered established if the Mooney could be controlled within plus or minus 3 Mooney points of the specified Mooney. However, the control presently achieved by most conventional systems is normally within plus or minus 10 Mooney points of specified Mooney. Disturbing influences which hamper good Mooney control are variations in monomer conversion, modifier flow, laboratory Mooney test results, vinyl acetylene concentration, and butadiene dimer concentration in the monomer feed stocks, and other impurities in reactor charge streams. Another major problem involved in Mooney control is the long time lag, for example on the order of 8-12 hours, between the time of initial charge to the reaction train and the time of receiving Mooney test results.

An inability to control Mooney within a specified range means that when off-specification latex is made, it is necessary to produce off-specification latex on the other side of the specification range so that these materials can be blended to obtain the desired Mooney. The time required to make the blending material, that is the off-specification latex on the other side of the specification range, and the actual time in blending can result in lost production time. It is also difficult to determine the detrimental effects on the physical properties of the rubber, resutling from the blending of latices, the Mooney viscosities of which vary over a wide range. Even if the effect were slight, it is still often desirable to produce polymers within a narrow Mooney range for other reasons.

Mooney is generally controlled in conventional systems by varying the initial modifier level and by the use of modifier boosters. The boosters are used to produce quicker Mooney response when it is desired to lower the Mooney. Variable amounts of modifier can be added to the middle third of the reactor train depending upon how low a Mooney is desired. The only means of increasing the Mooney is to change the initial modifier level. As previously noted such control systems can generally maintain the Mooney only within plus or minus 10 Mooney points of the specification Mooney in contrast to a desired Mooney of plus or minus 3 Mooney points of the specified Mooney.

Normally the control of bound styrene presents few problems. However, when difficulty is encountered, it can result in considerable loss of production time. For instance, when low bound styrene content polymer is produced, high bound styrene material must be made for blending purposes. The major problem in bound styrene control in conventional systems is that the existence of an incorrect ratio of butadiene to styrene does not reveal itself until the polymer is formed and laboratory tests are performed. Since the polymerization time may be on the order of 9 hours and the analysis time on the order of 5 hours, the generally obtainable minimum time involved in determining that the polymer produced is off-specification is approximately 14 hours.

Control difficulties with Mooney and monomer conversion during constant charge rate become magnified when it is necessary to change the charge rate. After altering the charge rate, the residence time of the latex then in the train constantly changes until the material initially charged to the first reactor at the new rate reaches the end of the train. During this variable residence time the length of the train must be constantly varied to keep the conversion as close as possible to the specification range. The resulting Mooney during this transition period varies with the monomer conversion.

Reasons for changes in charge rate include change in production schedule demands, equipment failure, such as mechanical failures of equipment in the monomer recovery and finishing areas, and process control problems such as the storage of off-specification latex with regard to Mooney or bound styrene until such time as blending material can be produced.

In accordance with the invention there is provided method and apparatus for continuously blending a plurality of fluid streams to obtain a combined fluid stream having a predetermined desired flow rate and a predetermined desired ratio of selected components wherein each stream is analyzed for the concentration of the selected components contained therein. Such concentrations are multiplied by the flow rate of the respective stream and the thus obtained flow rates of the individual components are added for each of the streams to obtain the total flow rate for each component. The flow rate of each individual stream is manipulated responsive to the total flow rates of the respective individual component to maintain the ratios of the components in the combined stream substantially constant.

Also in accordance with the invention there is provided method and apparatus for automatically and periodically calibrating a flow controller through the utilization of a storage zone upstream of the flow controller and periodically discontinuing the flow of fluid from the source to the controller and measuring the amount of time required for a predetermined volume of fluid to pass from the storage zone into and through the flow controller system.

Further in accordance with the invention there is provided method and apparatus for maintaining a predetermined percent conversion in a butadiene-styrene polymerization system by measuring the concentration and flow rates of impurities in the feed stream and predicting the flow rates of activator and oxidant required to maintain the predetermined percent conversion. There is also provided method and apparatus for measuring the actual percent conversion and modifying the predicted conversion to account for any discrepancies therebetween.

In accordance with the invention there is also provided method and apparatus for maintaining a substantially constant Mooney value of the product of a butadiene-styrene polymerization system by the manipulation of the initial modifier addition rate responsive to the predicted value of modifier required to achieve the desired value of Mooney. There is further provided method and apparatus for adding an incremental amount of modifier in addition to the initial amount of modifier and controlling the rate of addition of incremental modifier responsive to differences between actual and predicted Mooney values of the final product.

Still further in accordance with the invention there is provided method and apparatus for manipulating the temperature of one or more of the final reactors in a reactor train responsive to differences between predicted and actual percent conversion to maintain the final actual conversion substantially constant and at a predetermined value.

Accordingly it is an object of the invention to provide improved method and means for blending a plurality of materials to obtain a feedstock having a predetermined composition and flow rate. Another object of the invention is to provide improved method and means for automatically calibrating a flow rate control means. A further object of the invention is to provide improved method and means for maintaining the percentage conversion in a reaction system substantially constant at a predetermined desired value. Another object of the invention is to provide improved method and means for maintaining predetermined desired Mooney values of the product of a polymerization system. Yet another object of the invention is to substantially reduce the amount of off-specification product from a polymerization system. Another object of the invention is to improve product quality and uniformity of product in a polymerization process. A still further object of the invention is to minimize the need for blending latices. It is an object of the invention to maximize production capacity. Another object of the invention is to minimize the amount of transition latex produced during feed flow rate or recipe changes.

Other objects, aspects and advantages of the invention will be apparent from a study of the disclosure, the drawings, and the appended claims to the invention.

The term "Mooney" as used herein refers to the property determined by means of the test for viscosity of rubber and rubber like materials by the shearing disk viscometer having the ASTM designation: D927–52T.

Figure 1A:
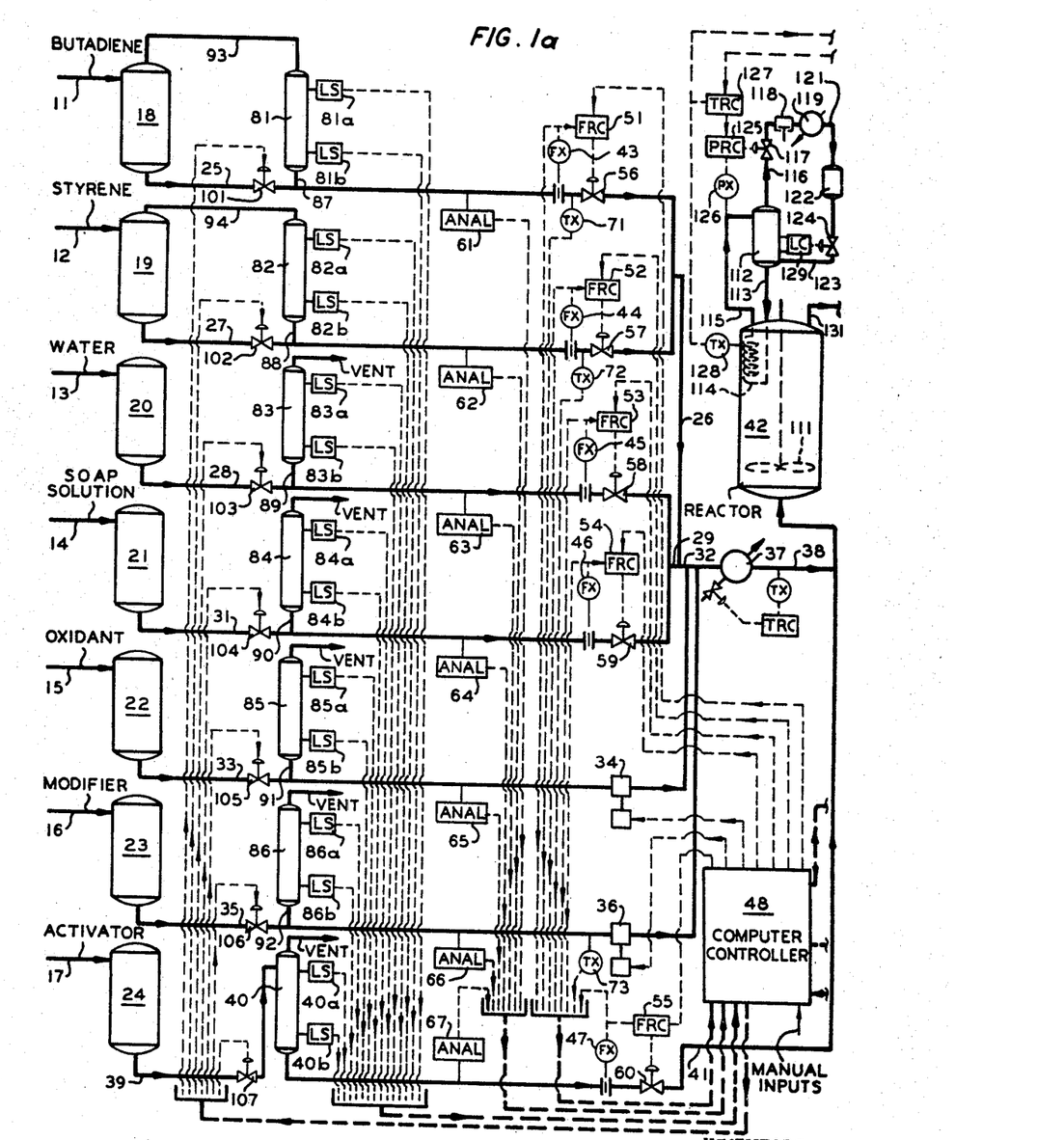
FIGURES 1a, 1b and 1c are related to each other as shown in FIGURE 1d and constitute a schematic representation of one embodiment of the invention.
Figure 1B:
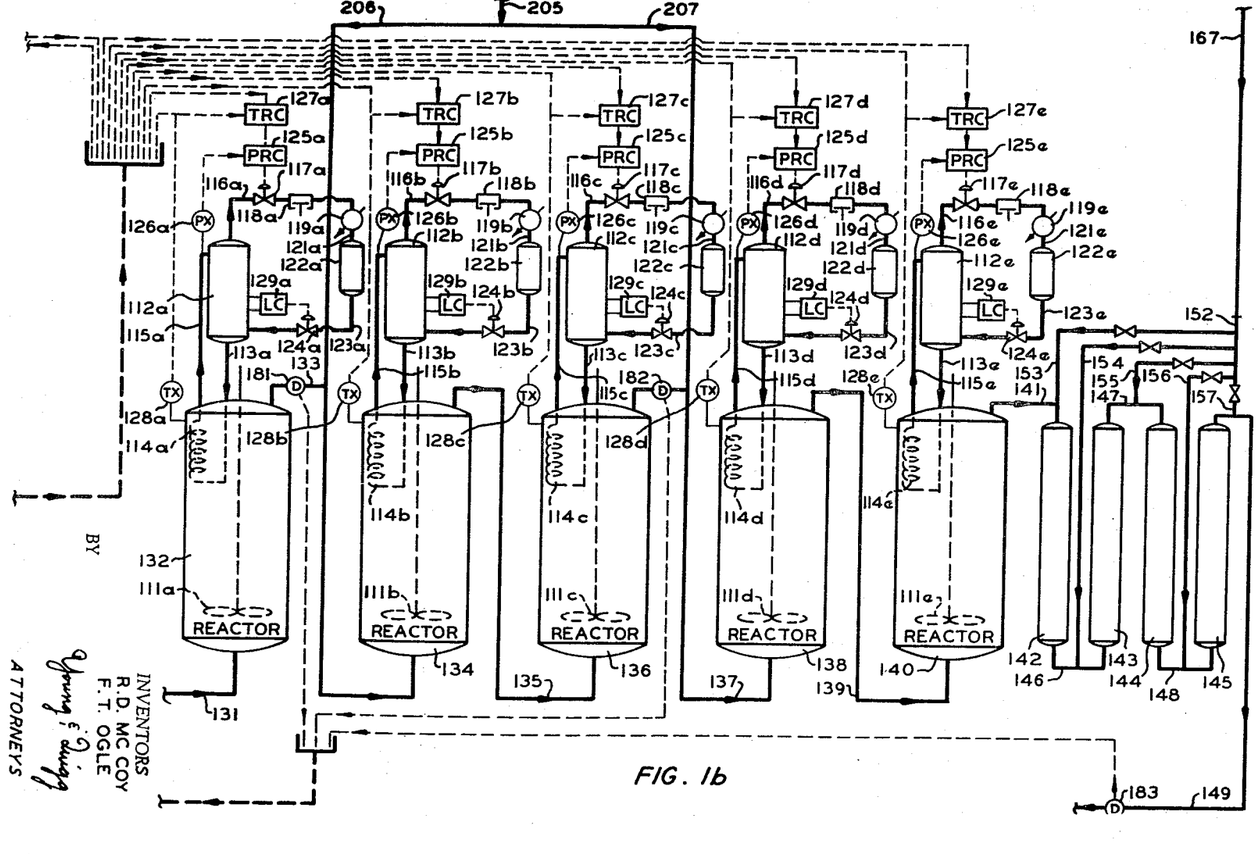
Figure 1C:
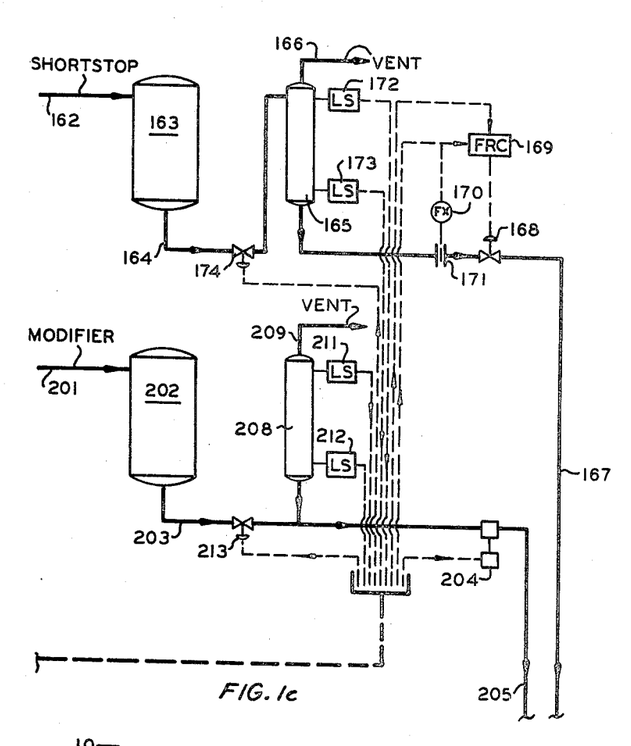
Figure 1D:
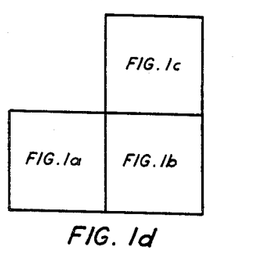

Butadiene, styrene, water, soap solution, oxidant, modifier, and activator are passed by way of conduits 11, 12, 13, 14, 15, 16 and 17 into respective storage tanks 18, 19, 20, 21, 22, 23 and 24. Butadiene is withdrawn from surge tank 18 and passed by way of conduit 25 into conduit 26 wherein it is admixed with styrene withdrawn from surge tank 19 by way of conduit 27. Water is withdrawn from surge tank 20 and passed by way of conduit 28 into conduit 29 wherein it is admixed with soap solution withdrawn from surge tank 21 by way of conduit 31. The blend of butadiene and styrene is passed from conduit 26 into conduit 32 wherein it is admixed with the aqueous soap solution from conduit 29. Oxidant is withdrawn from surge tank 22 and passed by way of conduit 33 and metering pump 34 into conduit 32 while modifier is withdrawn from surge tank 23 and passed by way of conduit 35 and metering pump 36 into conduit 32. The resulting admixture is passed through indirect heat exchanger 37 into conduit 38. Activator is withdrawn from surge tank 24 and passed by way of conduit 39, calibration tank 40, and conduit 41 into conduit 38 wherein it is admixed with the cooled admixture. The resulting total admixture constitutes the feed stream which is then introduced into a reactor 42.

Since the concentrations of the major constituents in their individual streams vary, it is necessary to continuously adjust the flow rate of these streams when a constant correct recipe is to be charged to the reactor train. In accordance with the invention, flow transmitters 43, 44, 45, 46 and 47 are operatively connected across orifices located in conduits 25, 27, 28, 31 and 41, respectively. A signal representative of the pressure drop across the respective orifice, and thus representative of the volume rate of flow of fluid through the respective conduit, is transmitted by each of flow transmitters 43–47 to computer-controller 48. The output signals of flow transmitters 43–47 are also transmitted to the inputs of flow recorder controllers 51–55, respectively. While orifice flow meters are illustrated in the drawings, any suitable flow measuring means can be utilized, for example, a turbine flow meter. The output signals of flow recorder controllers 51–55 are utilized to manipulate valves 56, 57, 58, 59 and 60, which are located in conduits 25, 27, 28, 31 and 41, respectively, and thereby regulate the rate of flow of fluid through the respective conduit. Samples of the streams flowing through conduits 25, 27, 28, 31, 33, 35 and 41 can be analyzed in analyzers 61–67, respectively. The ouput signals from analyzers 61–67 are transmitted to respective inputs of computer-controller 48.

The equations associated with the recipe control system are a series of eight material balance equations, one for each of the seven major constituents and one for the total flow. The material balance equation for butadiene can be stated as follows: (the concentration of butadiene in charge header 38) × (total charge rate of feed in conduit 38) = (concentration of butadiene in butadiene stream in conduit 25) × (flow rate of stream in conduit 25) + (concentration of butadiene in styrene stream in conduit 27) × (flow rate of stream in conduit 27) + (concentration of butadiene in water stream in conduit 28) × (flow rate of stream in conduit 28) + (concentration of butadiene in soap solution in conduit 31) × (flow rate of stream in conduit 31) + (concentration of butadiene in oxidant stream in conduit 33) × (flow rate of stream in conduit 33) + (concentration of butadiene in modifier stream in conduit 35) × (flow rate of stream in conduit 35) + (concentration of butadiene in activator stream in conduit 41) × (flow rate of stream in conduit 41).

Since it is known that the concentration of butadiene is zero in all but the butadiene and styrene streams, only the first two terms on the right hand side of the equation need be retained. The material balance equations for the remaining constituents are similar in form to the one illustrated for butadiene. The total flow equation is simply that the flow in charge header 38 is equal to the sum of the flows in conduits 25, 27, 28, 31, 33, 35 and 41. Any set of units can be used; gal./min. would be appropriate for flow rates and lb./gal. would be convenient to measure the concentrations. The desired recipe is applied to manual inputs of computer-controller 48 and can be in any convenient form, for example weight ratios between each constituents and monomer. The set of eight simultaneous linear equations with eight unknowns (seven flow rates and monomer concentration) is solved by computer-controller 48. The solution of this set of equations yields the values of the seven flow rates required in order to charge the correct recipe to the reactor train. Signals representative of the desired flow rates of butadiene, styrene, water, soap solution and activator are transmitted from computer-controller 48 and applied to the set point inputs of flow recorder controllers 51–55, respectively, while signals representative of the desired flow rates of oxidant and modifier are transmitted from computer-controller 48 to metering pumps 34 and 36, respectively. While analyzers 61–67 have been illustrated as on stream analyzers, it is within the contemplation of the invention to utilize periodic laboratory analysis of one or more of the various feed streams.

Where the main component streams are subject to temperature variations, suitable means can be provided to compensate for the resulting changes in density. For example, temperature transmitters 71, 72 and 73 can be operatively connected to conduits 25, 27 and 35 and utilized to transmit signals representative of the temperature of the fluids in their respective conduits to computer-controller 48. While only three such temperature transmitters have been illustrated it is also within the contemplation of the invention to use similar temperature transmitters on any one or more of conduits 28, 31, 33, and 41 as desired. The temperature signals can be utilized to convert the individual volume flow rate signals from flow transmitters 43–47 to mass flow rates.

In accordance with the invention, where it is desired to maintain a greater accuracy in the regulation of the flow rate of a major constituent than is generally provided by the conventional flow recorder controller, an automatic calibration system for periodic calibration of the flow recorder controller can be provided. The lower portions of calibration tanks 81–86 are connected by respective conduits 87–92 to conduits 25, 27, 28, 31, 33, and 35, respectively. The upper portions of calibration tanks 81 and 82 are connected by way of respective conduits 93 and 94 to the upper portions of surge tanks 18 and 19, respectively, to provide equalization of pressure between each of surge tanks 18 and 19 and their associated calibration tanks. The upper portions of calibration tanks 83–86 and 40 can be connected to the upper portion of their associated surge tanks or, as illustrated in the drawing, can be connected to an atmospheric vent. Each of calibration tanks 40 and 81–86 is provided with an upper liquid level sensor 40a, 81a–86a, respectively, and a lower liquid level sensor, 40b, 81b–86b, respectively, the output signals of which are transmitted to respective inputs of computer-controller 48. Valves 101–107 are provided in conduits 25, 27, 28, 31, 33, 35 and 39, respectively, upstream of the respective calibration tank.

In operation the position of the calibration tanks is such that each of the calibration tanks is filled with liquid to a point higher than the location of the associated upper liquid level sensor. When it is desired to calibrate the flow recorder controllers, signals are transmitted from computer-controller 48 to valves 101–107, thus discontinuing flow of fluid from the respective surge tank and causing the commencement of the draining of the fluid from each of the calibration tanks 40 and 81–86. As the liquid level in a tank drops below the location of the upper liquid level sensor, a signal indicative of such occurrence is transmitted to computer-controller 48. Similarly, when the liquid level in the calibration tank drops below the location of the lower liquid level sensor, a signal indicative of such occurrence is transmitted from the lower liquid level sensor to computer-controller 48. The volume of that portion of each tank between the location of the upper and lower liquid level sensors is predetermined. Computer-controller 48 contains a suitable timing mechanism which measures the time period required for the liquid level in each of the tanks to drop from the location of the respective upper liquid level sensor to the location of the respective lower liquid level sensor, such time period being proportional to the flow rate of fluid from the calibration tank into and through the respective feed conduit. The signal from computer-controller 48 to the set point input of the respective flow recorder controller is adjusted to compensate for any discrepancy between the measured flow rate as indicated by the respective flow transmitter and the actual flow rate as determined by the respective calibration tank. The output signals from computer-controller 48 to metering pumps 34 and 36 are adjusted to correct for any variation of the actual flow rate as determined by the respective automatic calibration tank from the desired flow rate. The automatic calibration can be effected on all seven feed conduits simultaneously or on one or more selected feed conduits as desired.

During a calibration period computer-controller 48 can measure the flow rate as determined by the conventional flow recorder controller to insure that the flow will remain sufficiently constant for good results to be obtained. If for some reason the flow changed during the calibration period, computer-controller 48 can start the calibration procedure over again.

The contents of reactor 42 wherein the feed mixture is subjected to polymerization conditions are stirred by means of an agitator 111 which is driven by any suitable means not shown). A suitable refrigerant, for example liquid anhydrous ammonia, is withdrawn from tank 112 and passed by way of conduit 113 into and through a coil 114 located within reactor 42, and thus in indirect heat exchange with the fluid contents of reactor 42. The refrigerant is partially vaporized in coil 114 and the resulting warmed refrigerant fluid is withdrawn by way of conduit 115 and introduced into tank 112. Refrigerant vapors are withdrawn from tank 112 and passed by way of conduit 116 and valve 117 to the inlet of a compressor 118. The compressed refrigerant vapors are then passed through indirect heat exchanger 119 wherein the compressed refrigerant vapors are condensed. The condensed refrigerant vapors are passed by way of conduit 121 into surge tank 122 and then through conduit 123 and valve 124 into tank 112. Valve 117 is manipulated by a pressure recorder controller 125 responsive to the pressure of the warmed refrigerant fluid in conduit 115 as indicated by a pressure transmitter 126 to maintain such pressure substantially constant. A temperature recorder controller 127 manipulates the set point input to pressure recorder controller 125 responsive to the temperature of the fluid in reactor 42 as indicated by a temperature transmitter 128 to maintain such temperature substantially constant. Thus the pressure (and thereby the boiling temperature) of the warmed refrigerant fluid in conduit 115 and tank 112 is varied in response to the temperature of the fluid in the reactor 42 to thereby change the rate of heat absorbed by the refrigerant in coil 114 in accordance with the change in rate of liberation of exothermic reaction heat and thus return the temperature of the fluid in reactor 42 to the desired value. Valve 124 is manipulated by liquid level controller 129 to maintain the liquid level in tank 112 substantially constant.

The effluent from reactor 42 is withdrawn therefrom and passed by way of conduit 131 into a second reactor 132, wherein it is subjected to polymerization conditions for an additional period of time. The effluent from reactor 132 is withdrawn therefrom and passed by way of conduit 133 into a third reactor 134. Similarly the effluent from reactor 134 is withdrawn therefrom by way of conduit 135 and is introduced into a fourth reactor 136. The effluent from reactor 136 is withdrawn therefrom by way of conduit 137 and introduced into a fifth reactor 138 and effluent from reactor 138 is withdrawn therefrom and passed by way of conduit 139 into a sixth reactor 140. Reactors 132, 134, 136, 138 and 140 have agitation and cooling systems similar to that of reactor 42 and corresponding components are identified by numerical designations for the system of reactor 42 followed by letters a, b, c, d, or e for reactors 132, 134, 136, 138, or 140, respectively. While six reactors have been disclosed in series it is within the contemplation of the invention to utilize any suitable number of reactors as desired. The effluent from reactor 140 is withdrawn therefrom and passed by way of conduit 141 to shortstop tubes 142, 143, 144 and 145 which are connected in series by means of conduits 146, 147 and 148. The reaction effluent is withdrawn from shortstop tube 145 and passed by way of conduit 149 to monomers and latex recovery. Shortstop material can be withdrawn from shortstop header 152 and introduced into the reaction effluent in any one of conduits 141, 146, 147, 148 or 149 by means of conduits 153–157, respectively. While the shortstop tubes have been shown as being in series, it is within the contemplation of the invention to provide suitable piping and valves to eliminate one or more of the shortstop tubes from the series as desired.

The shortstop for header 152 is passed by way of line 162 into storage tank 163. Shortstop is withdrawn from tank 163 and passed by way of line 164 into calibration tank 165 which is provided with a vent conduit 166. Shortstop is passed from calibration tank 165 through line 167 into header 152. Valve 168 is positioned in line 167 and is manipulated by flow recorder controller 169 responsive to output of flow transmitter 170 which is connected across orifice 171 located in line 167. Transmitter 170 also passes a signal representative of the rate of flow of shortstop to computer-controller 48. The set point input of controller 169 is manipulated by computer-controller 48. Upper liquid level sensor 172 and lower liquid level sensor 173 are provided on tank 165 to transmit the liquid level signals to computer-controller 48 for the calibration of flow controller 169. Valve 174 is positioned in line 164 and is controlled by computer-controller 48 to permit the operation of calibration tank 165.

Conversion relates to the percent of the pure monomers charged that have been converted to rubber. However, conversion is subject to variations which can be attributed primarily to various impurities in the charge streams, particularly oxygen and butylenes in the butadiene stream. The ultimate aim of the conversion control system is to predict, at any time and at any place along the whole reactor train, both the rate of conversion and the actual conversion and to manipulate appropriate variables to maintain the actual conversion at a desired value. With any change of monomer concentration, impurity levels, or other recipe constituent concentration, the conversion control system can be utilized to derive the appropriate values for oxidant and activator concentrations valid for the new circumstances. Generally, speaking, any impurity can have the effect of both inhibiting the reaction during the initial stage of the polymerization process and retarding the reaction during the remaining major portion of the polymerization process where the conversion follows an essentially linear relationship with time.

As with any mathematical model of a process, certain assumptions have to be made. The Smith-Ewart theory can be assumed to be valid over the major part of a conversion-time curve. This theory indicates the existence of a constant reaction rate for a specific soap and initiator level. It is desirable that the mathematical model utilize coefficients which have been derived from actual plant data gathered over a long period of time and where the initiator concentrations have varied over a sufficiently broad range.

The conversion control model also includes the nonlinear aspects of the emulsion-polymerization process. The variable ratio of polymer to monomer in the growing micelles caused by the impurity build-up as well as total depletion of the monomers in the hydrocarbon phase during the latter part of the polymerization process, i.e., after the soap has disappeared, and the nonlinear effect of the changing number of particles during the initial part of the polymerization are incorporated into the conversion control model.

Figure 2:
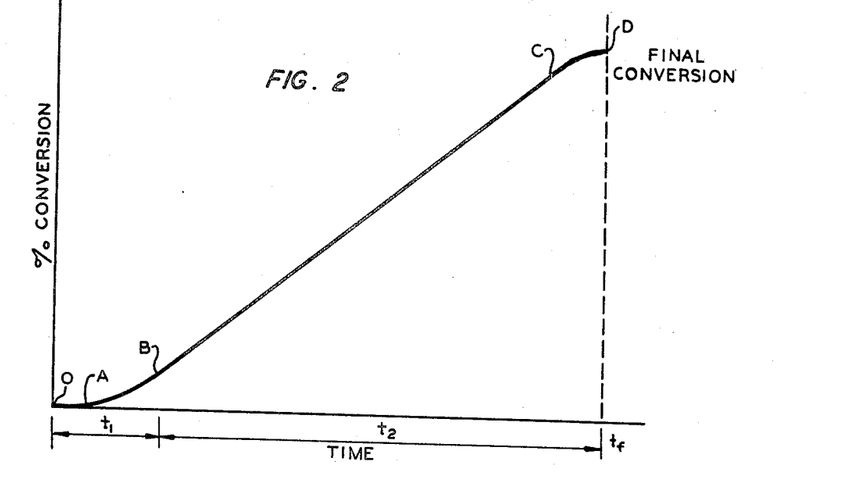
FIGURE 2 is an idealized graph of the relationship between time and percent conversion.

Referring now to FIGURE 2 the different phases of the emulsion polymerization reaction as represented by an idealized time curve are illustrated. After an initial inhibition period, OA, the polymerization reaction starts. Time period AB indicates that part of the reaction where the monomer/polymer particles are being formed. During time period BC, conversion rate is constant and the monomer/polymer ratio in the growing particles is assumed constant. At time C all of the monomer in the hydrocarbon phase has diffused to the monomer/polymer particles so that during time period CD the ratio in these particles decreases.

In accordance with the invention the conversion model is utilized to keep the final conversion obtained over a predetermined time (depending upon feed rate and number of reactors) constant with changing total inhibition time and retarding effect.

The time $T_f$ required to achieve the desired final conversion can be defined as:

$$T_f = \sum_1^8 \frac{\psi_i C_i}{C_a} + K_1(C_o)^{N_1}(C_a)^{N_2}(C_s)^{N_3} + t_2 \quad (1)$$

wherein the series 1–8 represents the various impurities in the butadiene and styrene, for example, vinyl acetylene, tert-butyl-catechol, oxygen, butylenes, miscellaneous butadiene impurities, butadiene-dimer, ethylbenzene, and miscellaneous styrene impurities, respectively;

$\psi_1$ is the inhibition coefficient for impurity $i$;

$C_1$ is the concentration of impurity $i$ in the total feed to the first reactor;

$C_a$ is the concentration of the activator in the total feed to the first reactor;

$C_o$ is the concentration of the oxidant in the total feed to the first reactor;

$C_s$ is the concentration of the soap solution in the total feed to the first reactor;

coefficient $K_1$ and exponents $N_1$, $N_2$, and $N_3$ are constants; and $t_2$ is the time period from point B to point D in the conversion-time graph in FIGURE 2, that is, the total resident time less the initial inhibition time period OA and the time period AB required to form the monomer/polymer particles.

The conversion $X_t$ at any point in the reactor train subsequent to the formation of the monomer/polymer particles (that is, subsequent to point B in FIGURE 2) can be defined as:

$$X_t = K_2 \frac{P_M}{C_M}(C_o)^{N_4}(C_a)^{N_5}(C_s)^{N_6} + t_3 \left[ K_3 \frac{P_M}{C_M}(C_o)^{N_7}(C_a)^{N_8}(C_s)^{N_9} - \sum_1^8 \psi_i C_i \right] \quad (2)$$

where $K_2$, $K_3$, $N_4$, $N_5$, $N_6$, $N_7$, $N_8$, and $N_9$ are constants;

$P_M$ is the weight fraction of monomer in the particles;

$C_M$ is the concentration of the monomer in total feed to the first reactor;

$\psi_1$ is the retardation coefficient for impurity $i$;

$C_i$ is the concentration of impurity $i$ in the total feed to the first reactor; and $t_3$ is the time period between point B and point $t$ on the graph in FIGURE 2, that is, the time period subsequent to the formation of the monomer/polymer particles. Thus $t_3 = t_2$ when $t = T_f$.

In general the flow rates of the oxidant and the activator are regulated to maintain the ratio of oxidant to activator in the total feed substantailly constant. This constant combination of oxidant and activator is often treated as a single material termed the initiator. The soap solution concentration ($C_s$) is a function of the monomer concentration in the feed stream. Thus Equations 1 and 2 can be utilized to determine the desired initial concentrations of activator ($C_a$), and oxidant ($C_o$) as $T_f$ is the residence time in the reactors and is a function of the desired total feed flow rate while $X_t$ can be set at the desired final conversion. The initial impurity levels are measured and their values inserted in the equations. With two equations in two unknowns (initiator concentration and $t_2$) the initially required values of $C_a$ and $C_o$ can be determined. Computer-controlled 48 transmits signals responsive to the required values of $C_o$ and $C_a$ to metering pump 34 and the set point input of flow controller 55, respectively, to maintain the conversion at the desired value despite variations in impurity concentrations. Equation 2 can also be utilized to predict the percent conversion at any point in the reactor train from presently existing values of $C_a$ and $C_o$.

Referring again to FIGURE 1, suitable densitometers 181, 182, and 183, for example the Series 300 AccuRay Density Electronic Instrument manufactured by the Industrial Nucleonics Corporation, 650 Ackerman Road, Columbus, Ohio, are located in lines 133, 137, and 149, respectively, for determining the actual conversion at the outputs of the second and fourth reactors and the final conversion. The AccuRay passes a beam of gamma radiation through the line and determines the amount of such radiation which is absorbed by the contents of the line. Such absorption is a function of the density of the line contents, which in turn is a function of the percentage conversion and the density of the feed stream. In accordance with one aspect of the invention computer-controller 48 utilizes the data available on the composition and flow rate of the streams in lines 25, 27, 28, 31, 33, 35 and 39 to predict the variations which will occur in the density of the material in lines 133, 137 and/or 149 due to variations in the density of the feed stream. This signal can be utilized predictively to compensate the output signal of the densitometer for variations due to fluctuations in feed stream density, thereby producing a corrected, more accurate signal representative of the conversion at the location of the densitometer.

Since it is virtually impossible to establish a perfect model of the conversion process, it is desirable that some means be provided for correcting any inaccuracies in the model. Conventional feedback arrangements are not suitable for this purpose due to the long time lags which are involved. In accordance with one aspect of the invention, the corrected output signals from the densitometers are compared against the corresponding predicted conversions and any variations between the pairs are utilized to update the coefficients of the model, for example one or more of $K_1$, $K_2$, $K_3$, and $N_1$–$N_9$ of Equations 1 and 2. The updated equations are then utilized to determine the new values of $C_o$ and $C_a$ required and signals responsive to the total flow rate to the first reactor and these new values of $C_o$ and $C_a$ are transmitted by computer-controller 48 to metering pump 34 and the set point input of flow controller 55, respectively. Thus a control system in accordance with the invention maintains the desired final percent conversion by manipulating the flow rates of the activator and the oxidant responsive to variations in impurity levels in the feed and responsive to variations between predicted and actual percent conversion at one or more points in the reactor train.

A simplified example will be used to demonstrate the manner in which the conversion model is used to control the process in light of impurity changes. For this example, assume that a particular impurity increase has the sole effect of retarding the reaction.

Figure 3:
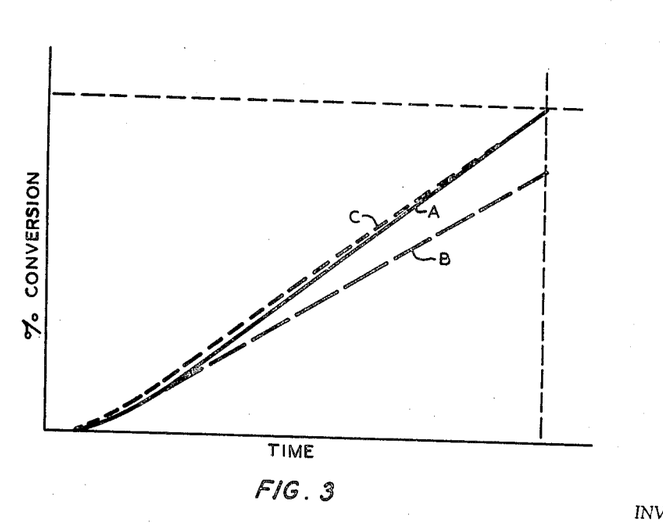
FIGURE 3 is a conversion-time graph illustrating effects of conversion control to offset an impurity increase.

Curve A in FIGURE 3 shows the conversion-time relationship prior to this impurity increase. Curve B in FIGURE 3 depicts what would happen without conversion control. Now assume that the conversion model is available for the compensation of impurities. The new impurity concentration is entered into one of the equations in the model from which the new values of oxidant and activator concentrations are calculated. From these concentrations the new flow rates are calculated from the feed blending model. The increase in oxidant and activator flows will allow the maintenance of constant conversion; i.e., the reaction will now follow curve C. A similar analysis can be made for an impurity which has an inhibiting effect, or a combination of inhibiting and retarding effects. The coefficients related to the inhibiting and retarding effects of the different impurities are preferably derived from actual plant data.

By utilizing the feed blending model and the conversion models previously discussed to maintain closer control over conversion, much of the variability in Mooney presently experienced will be eliminated. This is so because a one percent change in conversion causes from one to two percent in change in Mooney. Certain impurities such as vinyl acetylene and butadiene dimer in the charge stream, however, will nevertheless affect Mooney. The Mooney control model will accept information regarding the concentration of these impurities and compensate for them much in the same manner as described for the conversion control model. In this case control action can be achieved by adjusting the modifier level.

Both Mooney and intrinsic viscosity are directly related to the molecular weight distribution of the final latex. The molecular weight distribution of the polymer being formed at each moment of the polymerization is dependent upon both monomer and modifier concentrations. The relationship between the monomer consumption (i.e., the conversion) and the modifier consumption can be established in the laboratory or from plant analysis. These measurements can be utilized to form the modifier depletion curves. A prediction of the monomer concentration over the total reaction train (i.e., the conversion model) is therefore analogous with a prediction of the modifier consumption and permits the prediction of the final molecular weight distribution curve which result from a summing of all the instantaneous distributions.

In the Mooney control model for the initial modifier charge control, Mooney can be defined as:

$$M = K_4 + K_5 \left(\frac{C_M}{C_c R}\right)^{0.67} \left[\frac{(1-x)^{\gamma(1-R)+1}-1}{x(\gamma R - \gamma - 1)}\right]^{\frac{0.67}{\gamma}} \quad (3)$$

wherein

M is Mooney;
$K_4$ and $K_5$ are constants;
$C_M$ is the concentration of monomer in the total feed to the first reactor;
$C_c$ is the concentration of the modifier in the total feed to the first reactor;
R is the apparent transfer constant;
x is conversion; and
$\gamma$ is an averaging constant.

Equation 3 is a Mooney predicting model based on a combination of empirical findings and properties of the formed polymer molecular weight distribution. To find the apparent transfer constant R, plant samples can be taken at different conversions and the content of non-consumed modifier determined. The apparent transfer constant R is then determined from the log modifier-log conversion curve. Once a value of R has been established, the values of $K_4$, $K_5$ and averaging constant $\gamma$ can be found via regression analysis.

Equation 3 can be utilized to determine the concentration of the modifier in the total feed to the first reactor required to maintain M at the desired Mooney value. Computer-controller 48 transmits a signal responsive to the require value of $C_c$ and the total feed flow rate to the first reactor to metering pump 36 which manipulates the flow rate of modifier through line 35 to maintain the desired value of $C_c$.

When it is desired to utilize an incremental modifier, the Mooney model at conversion $x_2$ can be defined as:

$$M = K_4 + K_5 \left[\frac{\left(\frac{C_M}{C_c R}\right)^\gamma \frac{(1-x_1)^{\gamma-\gamma R+1}-1}{\gamma R - \gamma - 1}}{x_2}\right.$$
$$\left. + \frac{\left(\frac{C_M(1-x_1)^Q}{QC_c(1-x_1)^R + \Delta Q}\right)^\gamma \frac{(1-x_2)^{\gamma(1-Q)+1}-(1-x_1)^{\gamma(1-Q)+1}}{\gamma(Q-1)-1}}{x_2}\right]^{\frac{0.67}{\gamma}}$$
$$+ K_6 h_1 - K_7 h_2 \quad (4)$$

wherein $x_1$ is the conversion at the point of introduction of the incremental modifier;
Q is the apparent transfer constant after the introduction of the incremental modifier;
$\Delta$ is the modifier concentration resulting from the addition of the incremental modifier;
$x_2$ is the conversion at a point downstream of the point of addition of the incremental modifier;
$K_6$ and $K_7$ are constants; and
$h_1$ and $h_2$ are correction functions for the concentration of vinyl acetylene and butadiene dimer in the total feed to the first reactor, respectively.

Referring again to FIGURE 1, modifier for incremental addition is passed by way of line 201 into storage or surge tank 202. Modifier is passed from tank 202 via line 203, metering pump 204, and line 205 into one or both of lines 206 and 207. Line 206 communicates with line 133 while line 207 communicates with line 137. The number and locations of the points of addition of incremental modifier can be varied as desired. Calibration tank 208 is connected between line 203 and vent line 209. Upper liquid level sensor 211 and lower liquid level sensor 212 are positioned on tank 208 for the transmission of the liquid level signals to computer-controller 48. Valve 213 is located in line 203 and controlled by computer-controller 48 to permit the operation of calibration tank 208.

In utilizing Equation 4 for Mooney control, only initial modifier is used to compensate for impurity concentration changes in the feed.

The conversion at the point of incremental modifier addition will not be constant because of variations in conversion rate. Therefore on the basis of a continuous measurement of the conversion at the point of addition of incremental modifier, $x_1$, the increment $\Delta$ can be periodically redetermined and the incremental modifier flow rate adjusted accordingly. For this calculation the value of concentration of the initial modifier in the total feed stream to the first reactor recorded $nt_r$ hours earlier (assuming the incremental modifier is added at the end of the $n$th reactor and the residence time for a single reactor is $t_r$) will be taken. Or alternatively, the effects of feed forward mixing on this value of the concentration of the initial modifier and the total feed to the first reactor can be taken into account. The final conversion $x_2$ is measured on-line by densitometer 183. The utilization of the output of densitometer 183, or preferably the compensated output of densitometer 183, in the second term within the brackets of Equation 4 leads to predicted Mooney values on the basis of the varying final conversion.

Figure 4:
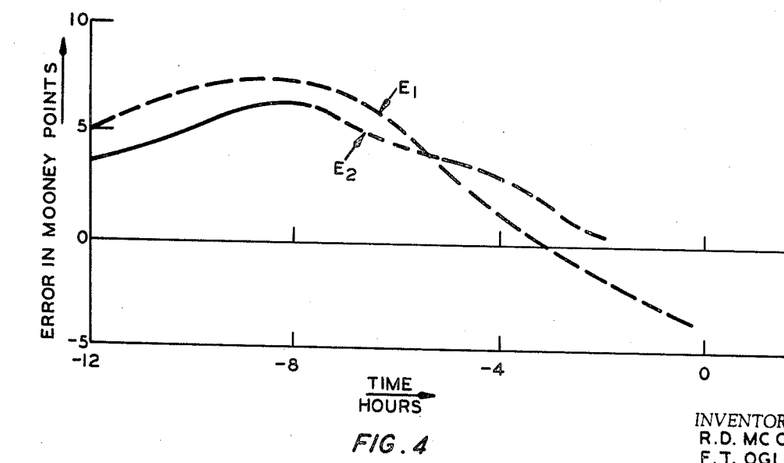
FIGURE 4 is a graphic representation of calculated and measured Mooney errors as a function of time.

As an example of the use of this model, refer now to FIGURE 4. Curve $E_1$ represents the deviation between the predicted Mooney and the required value. This deviation results from a variation in conversion. Curve $E_2$ is the deviation between the actual measured Mooney value and the required one. At $t=0$ hour the available Mooney information consists of correct error values up to $t=-2$ hours, plus calculated error values for the next 2 hours (assuming a lag time of 2 hours for the Mooney measurement). Part of the normal control calculation cycle can be utilized to find a value for $\Delta$, such that the average Mooney from $t=-12$ to $t=t_f$ hours is constant, or $$M_r = \frac{\int_{-12}^{-2}(M_r+E_2)Fdt + \int_{-2}^{0}(M_r+E_1)Fdt + \int_{0}^{t_f}(M_r+E_3)Fdt}{\int_{-12}^{t_f}Fdt} \quad (5)$$

wherein $M_r$ is the required constant average Mooney value;
$E_1$ is the predicted Mooney error signal;

$E_2$ is the measured Mooney error signal obtained from the deviation between the actual measured Mooney value and the required one;

$E_3$ is the deviation from the required value of Mooney necessary to compensate for the off-specification polymer produced between $t=-12$ and $t=0$;

F is the total feed flow rate.

For the third integral the computer can use predicted Mooney values for the period between 0 and $t_f$, then calculate the value of $E_3$ necessary during this period to give the required constant average $M_r$ over the entire period between $-12$ and $t_f$. The incremental modifier flow rate can then be changed to give the correct $E_3$. In making the calculation of required $E_3$ and then taking the control action on incremental modifier flow rate, due account must of course be taken of the time delay between modifier addition and effluent Mooney.

The value of $(E_1-E_2)$ can be utilized for the purpose of updating the Mooney model. This difference indicates the true discrepancies between predicted and measured Mooney value. The updating signal can be utilized to revise the value of $K_4$, $K_5$, R or Q in Equation 4. A straightforward method is to introduce two separate constants $K_5'$ and $K_5''$ for the first and second terms between brackets in Equation 4, respectively. The first of these two constants can then be kept constant, whereas the error signal updates the latter one with a frequency depending on the frequency with which the Mooney measurements are carried out.

The control actions made on the basis of the recipe and conversion control models previously discussed do not completely eliminate variability in conversion. It is possible to obtain appropriate measures of conversion in the reactor train and to determine what variability in this parameter remains after the corrective action based on the receipe and conversion models has been taken. As the rate of reaction, and therefore the final conversion, can be altered by adjusting reactor temperatures, it is possible to improve conversion control by adjusting reactor temperature on the basis of a comparison of the desired conversion and the actual conversion at a point somewhere in the middle of the reactor train. Since wide variations in temperature affect product quality in other ways besides conversion, it is desirable that only small variations in temperature be utilized in the control system. This limits the control exercised by means of temperature variation to a trimming action and precludes the exclusive use of a temperature trimming for conversion control. The utilization of temperature trimming, however, reduces accuracy requirements on the recipe and conversion control models to more tolerable limits.

To illustrate the general control philosophy further, consider the idealized conversion versus time curve shown in FIGURE 2. As previously discussed, OA represents the inhibition period, AB the period when the monomer-polymer particles are being formed, BC the constant conversion rate and CD the period when the monomer-polymer ratio in the particles decreases. The drop from C to D is slight and for the purpose of this discussion can be neglected (correction for this effect can be accomplished by adding correction terms in the equations, as desired). After B, when all the monomer-polymer particles have been formed, the future course of tthe reaction has been substantially defined. The slope of the curve from B on is proportional to the number of particles formed. Prior to time B all monomer-polymer particles have not been formed and it is not possible to determine what the future slope in the linear region will be by utilizing on-line measurements. For this reason it is preferable that the temperature trimming control be exercised over the latter part of the train, from approximately 30 percent conversion on in a system where the final desired conversion is approximately 60 percent.

Assuming, for illustrative purposes, that plug flow exists in the process, (i.e., neglecting forward mixing) it is seen that, for any "batch" of latex, a measure of conversion at some point beyond B and knowledge of the remaining residence time is sufficient information to determine the slope of the curve required to achieve the desired value of final conversion. As the slope of the curve beyond point B is a function of temperature and proportional to the density of monomer-polymer particles, and it is known that at temperatures near 41° F. the slope of BC doubles approximately for each 20° F. increase, the slope of BC may be expressed as:

$$\text{(slope of } BC) = kN2^{\frac{\theta-41}{\beta}} \quad (6)$$

wherein k is a proportionality constant,
N is the number of particles per gallon in the "batch,"
$\theta$ is the temperature, and
$\beta$ is a constant approximately equal to 20° F.

The value for $k$N can be obtained by measuring conversion rate (or slope) at some known temperature and using the above equation. Suppose, for example, the conversion rate is measured at 41° F., then $k$N is simply equal to the measured value. Substituting this value into Equation 6 for $k$N and substituting the required slope of BC (previously computed on the basis of conversion and remaining residence time) for the (slope of BC), the following equation is obtained:

$$\text{(required slope of } BC) = \text{(measured slope of } BC)^{\frac{\theta-41}{2\beta}} \quad (7)$$

Thus the $\theta$ in Equation 7 represents the required temperature for the remaining part of the reaction if a final conversion of 60% is to be obtained. In the foregoing it has been shown, for plug flow conditions, how an appropriate temperature can be computed for each "batch" of latex on the basis of conversion rate and a knowledge of the remaining residence time. Control can be achieved by sequencing these computed values of temperatures from reactor to reactor as the "batches" move toward the end of the train. Referring again to FIGURE 1, this can be accomplished by computer-controller 48 transmitting appropriate signals to the set point inputs of temperature controllers 127–127e, which in turn control the temperature of the contents of the respective reactor.

The previous discussion was based on the assumption of "plug flow" conditions. However in accordance with one aspect of the invention, forward mixing is taken into account to provide a more accurate control system.

Referring again to FIGURE 1, densitometers 181, 182, and 183 transmit to computer-controller 48 signals representative of the density of the contents of lines 133, 137 and 149. Flow transmitters 43–47, temperature transmitters 71–73, and analyzers 61–67 provide computer-controller 48 with signals representative of the flow, density and concentration of various constituents in the feed as well as data on flow and density of total feed. This feed data is utilized by computer-controller 48 to correct the output signals of densitometers 181, 182 and 183 for variations in density of the total feed to the first reactor. The corrected output signals from densitometers 181 and 182 are representative of the conversion at the respective locations and can be utilized to determine the rate of conversion. If the feed-blending and the conversion control models were perfect, there would be no reason for these percent conversion and conversion rate inputs, or for that matter, the temperature trimming model; but since some variability does exist, these measurements provide appropriate information so that temperature trimming can be utilized to compensate for the remaining errors. A feedback loop can be provided for updating the models of the reactors in the part of the train prior to the conversion measurements (i.e., reactors 42 and 132) through the utilization of means for producing an error signal responsive to a comparison of the measured density with predicted density. The error signal can be filtered and used to adjust parameters in the models of these reactors in the first part of the train to reduce errors in the corrective terms generated by these models.

A predicted value of final conversion, taking temperature trimming into account, is established. This value is compared with the value determined on the basis of density measurement by densitometer 183 and an error signal is generated. This error signal is not conventional in the sense of indicating the error between obtained and desired control system performance but rather it indicates an error in the performance of the model. This signal is filtered and fed back to update parameters in the model.

In taking this approach to feedback, a number of advantages are gained. The model updating is carried out properly regardless of control system performance, and irrespective of whether the computer is being used to control the process. Greater stability is also achieved and the overall performance of the control system is improved. Filtering of the error signal is included to obtain some average value over the recent past. In adjusting the parameters of this filter a compromise must be established between a desire to correct the model as soon as possible and a desire to reject transient errors which are short term in nature. For example, it would not be wise to modify the model extensively on the basis of one density measurement which could be in error; on the other hand if too much lag is placed in this part of the loop, the model will not keep up with changing parameters of the process.

Stability is another consideration in determining parameters of this filter. In establishing the model, effort has been expended to represent the process as closely as practical thereby reducing the requirements on this loop. In practice it has been found the parameters can best be obtained using rough preliminary calculations and then accomplishing the final adjustment while the computer is on-stream, but off control. Similar filtering techniques can be used on the inputs from all the densitometers should their performance indicate the possibility of reducing error in this fashion.

Computer-controller 48 can be utilized to predict the values of concentrations, density, particle density, and percent conversion for each reactor. In addition signals representative of the temperature of the contents of reactors 42, 132, 134, 136, 138 and 140 are transmitted to computer-controller 48 by temperature transmitters 128–128e, respectively. The problem of establishing control equations now takes on a somewhat different light than previously discussed for the plug flow model. Instead of only one value for conversion and conversion rate on which to base temperature control, the problem can now be treated as though measuring devices for density, flow rates, number of particles, conversion and concentrations of various constituents, in each reactor had been provided. Initially, one can use the analysis previously presented for the plug flow model in determining the desired reactor temperature. In this case, however, a separate computation of the desired temperature would be made for each reactor. The sequencing effect can be achieved by utilization of computer-controller 48 to sequence reactor conditions down the train at times which account for forward mixing.

It is desirable that information be fed back from the end of the train and used to modify signals controlling previous reactors. For example, rather than use the conversion data predicted on the basis of the model, the actual measured conversion at the output of reactor 140 can be supplied to the model for reactor 138 and utilized for adjusting the predicted value at the output of reactor 138. Similarly, the actual measured conversion in the last reactor can be utilized to adjust parameters in the model for the previous reactor other than the last reactor. In this fashion a tight conventional feedback control loop can be established for the reactors close to the end of the train. It is here that the over all control loop is closed by a comparison of the actual conversion with the desired conversion. However, due to the long time lags involved in the reactor train, this approach cannot be extended too far, that is to reactors in the first part of the train without resulting in a decrease in performance rather than an increase.

Thus the temperature trimming model comprises means for varying the temperature of the last reactors in the train responsive to an error signal between the actual final conversion and predicted final conversion in order to maintain this error signal at a minimum, that is to maintain actual final conversion equal to desired final conversion.

For a variety of reasons, based primarily on difficulties with the further processing steps, feed rate changes are imposed on the reaction area. The computer-controller 48 can also be utilized to schedule the conditions in the various reactors to minimize off-specification product caused by a change in feed rate. Two general types of feed rate changes can be considered: scheduled and unscheduled. In the case of scheduled changes it is possible to prepare the reactor train for a change prior to actually making that change. For example six hours prior to a scheduled feed rate change computer-controller 48 can commence adjusting the initiator level, so that, when the change is made, the material in each reactor along the train will be reacting at a rate which corresponds to the new value of remaining residence time for that particular "batch" of material. To make the transition smooth the actual change in feed rate is preferably made under the control of computer-controller 48 on the basis of data obtained from the densitometers 181, 182 and 183 and the temperature trimming model. Reactor temperatures can also be utilized to smooth out discrepancies which might arise. In this fashion it is possible to maintain complete control of conversion throughout the transition period.

For unscheduled changes, advance notice normally is not given and obviously some other procedure is required. For example conditions downstream of the reactors can dictate that an immediate change in feed rate be made. This change in feed rate can be accomplished by action of the operator. Computer-controller 48 upon sensing the change in feed rate will then adjust the initiator level and reactor temperatures so as to minimize the amount of off-specification material produced. In the case of drastic flow rate changes computer-controller 48 can be preprogrammed to change the number of reactors in the train.

In addition to feed flow rate changes, it is also desired to utilize computer-controller 48 to maintain control during the transition between different required Mooney values or during a change of total recipes. Qualitatively, this could be done as follows.

Assume that a recipe change calls for a different soap and Mooney specification in order to make a different polymer. It is desired to produce this different polymer without shutting down the reactor train. It is also desired to make the transition from the previous polymer production to the new polymer production as short as practical. It is also desired to produce polymer during the transition period in such a manner that the average Mooney produced, when mixed in a receiving storage tank, is of the correct value called for by the new polymer specifications. It is also desired to distribute the soap transition substantially equal between the old and the new polymer storage tanks.

With the Mooney model of Equation 4 plus the reactor model dynamics as described for the temperature trimming model, computer controller 48 can be used to calculate the initial and incremental modifier flow rates, the times for changing these flow rates and the time for switching from one effluent product storage tank to another in order to meet the above requirements. A less rigorous method would be to pre-program the sequential steps, then use analyses of the effluent storage tank Mooney as a basis for calculating a "trimming" action using incremental modifier. This is analogous to the control scheme outlined for the temperature trimming model. In either case, however, computer-controller 48 would exercise complete control over the sequence of control actions.

Reasonable variation and modification are possible within the scope of the foregoing disclosure, the drawing and the appended claims to the invention.

We claim:

1. A method of continuously blending a plurality of fluid streams to obtain a combined feed stream having a predetermined desired flow rate and a predetermined desired ratio of selected components, each of said plurality of fluid streams being the primary source of a respective one of said selected components which comprises continually establishing a plurality of first signals, each of said first signals being representative of the flow rate of a respective one of said plurality of fluid streams; continually establishing a plurality of second signals, each of said second signals being representative of the concentration of a respective one of said selected components in a respective one of said plurality of fluid streams; continually establishing a plurality of third signals, each of said third signals being representative of the multiplication product of a respective one of said plurality of second signals and the corresponding one of said plurality of first signals such that each of said third signals is representative of the flow rate of a respective one of said selected components in a respective one of said plurality of fluid streams; continually establishing a plurality of fourth signals responsive to said plurality of third signals, each of said fourth signals being representative of the total flow rate of a respective one of said selected components in all of said plurality of fluid streams; continuously combining said plurality of fluid streams to form said combined feed stream; continually establishing a fifth signal representative of the flow rate of said combined feed stream; continually establishing a plurality of sixth signals, each of said sixth signals being representative of the ratio of a respective one of said plurality of fourth signals to said fifth signal and thus the concentration of a respective one of said selected components in said combined feed stream; and automatically controlling the flow rate of each of said plurality of fluid streams responsive to the sixth signal corresponding to the respective one of said selected components for which the respective one of said plurality of fluid streams is the primary source.

2. A process in accordance with claim 1 wherein each of said plurality of fluid streams is passed through a respective one of a first plurality of conduits and a respective one of a second plurality of conduits in series; wherein the step of controlling each of said plurality of fluid streams is effected by manipulating a valve in the respective second conduit; further comprising storing a quantity of the fluid of the respective fluid stream in a respective one of a plurality of storage zones at a point between the respective first and second conduits; automatically and periodically terminating the flow of fluid through said first conduits; establishing a plurality of seventh signals, each of said seventh signals being representative of the time required for a predetermined amount of fluid to pass from a respective one of said plurality of storage zones into the corresponding second conduit; and utilizing each of said seventh signals to correct the corresponding one of said plurality of first signals for any errors in the respective first signal.

3. A method of producing butadiene-styrene rubber which comprises continuously combining a plurality of fluid streams to form a combined feed stream, each of said fluid streams being a primary source of a respective one component of the group of butadiene, styrene, water, soap solution, oxidant, modifier and activator; the concentration of at least one component of said group in the respective fluid stream serving as the primary source thereof being subject to variations; continually establishing a plurality of first signals, each of said first signals being representative of the flow rate of a respective one of said plurality of fluid streams; continually establishing a plurality of second signals, each of said second signals being representative of the concentration of a respective one component of said group in a respective one of said plurality of fluid streams containing said respective one component of said group; continually establishing a plurality of third signals, each of said third signals being representative of the multiplication product of a respective one of said plurality of second signals and the corresponding one of said plurality of first signals such that each of said third signals is representative of the flow rate of a respective one component of said group in a respective one of said plurality of fluid streams which contains the respective one component of said group; continually establishing a plurality of fourth signals responsive to said plurality of third signals, each of said fourth signals being representative of the flow rate of a respective one component of said group in all of said plurality of fluid streams and thus in said combined feed stream; continually establishing a fifth signal representative of the flow rate of said combined feed stream; automatically controlling the flow rate of the one of said plurality of fluid streams which is the primary source of butadiene to maintain a predetermined desired flow rate of butadiene in said combined feed stream; and automatically controlling each of the remaining ones of said plurality of fluid streams responsive to the flow rate of butadiene and the ones of said fourth signals corresponding to the component of said group for which the respective fluid stream is the primary source to maintain a predetermined ratio in said combined feed stream between butadiene and each of the remaining components of said group; continuously passing said combined feed stream into a polymerization zone and therein subjecting the combined feed stream to polymerization conditions; and recovering a butadiene-styrene rubber from said polymerization zone.

4. Apparatus for continuously blending a plurality of fluid streams to obtain a combined feed stream having a predetermined desired flow rate and a predetermined desired ratio of selected components, each of said plurality of fluid streams being the primary source of a respective one of said selected components which comprises means for continually and automatically establishing a plurality of first signals, each of said first signals being representative of the flow rate of a respective one of said plurality of fluid streams; means for continually and automatically establishing a plurality of second signals, each of said second signals being representative of the concentration of a respective one of said selected components in a respective one of said plurality of fluid streams; means for continually and automatically establishing a plurality of third signals, each of said third signals being representative of the multiplication product of a respective one of said plurality of second signals and the corresponding one of said plurality of first signals such that each of said third signals is representative of the flow rate of a respective one of said selected components in a respective one of said plurality of fluid streams; means for continually and automatically establishing a plurality of fourth signals responsive to said plurality of third signals, each of said fourth signals being representative of the total flow rate of a respective one of said selected components in all of said plurality of fluid streams; means for continuously combining said plurality of fluid streams to form said combined feed stream; means for continually and automatically establishing a fifth signal representative of the flow rate of said combined stream; means for continually and automatically establishing a plurality of sixth signals, each of said sixth signals being representative of the ratio of a respective one of said plurality of fourth signals to said fifth signal and thus the concentration of a respective one of said selected components in said combined feed stream; and means for automatically controlling each of said plurality of fluid streams responsive to the sixth signal corresponding to the respective one of said selected components for which the respective one of said plurality of fluid streams is the primary source.

5. A method of producing butadiene-styrene rubber which comprises continuously combining a plurality of fluid streams to form a combined feed stream, each of said fluid streams being a primary source of a respective one component of the group of butadiene, styrene, water, soap solution, oxidant, initial modifier and activator; continually and automatically establishing a plurality of first signals, each of said first signals being representative of the flow rate of a respective one of said plurality of fluid streams; continually and automatically establishing a plurality of second signals, each of said second signals being representative of the concentration of a respective one component of said group in a respective one of said plurality of fluid streams containing said respective one component of said group; continually and automatically establishing a plurality of third signals, each of said third signals being representative of the multiplication product of a respective one of said plurality of second signals and the corresponding one of said plurality of first signals such that each of said third signals is representative of the flow rate of a respective one component of said group in a respective one of said plurality of fluid streams which contains the respective one component of said group; continually and automatically establishing a plurality of fourth signals responsive to said plurality of third signals, each of said fourth signals being representative of the flow rate of a respective one component of said group in all of said plurality of fluid streams and thus in said combined feed stream; continually and automatically establishing a fifth signal representative of the flow rate of said combined feed streams; automatically controlling the flow rate of the one of said plurality of fluid streams which is the primary source of butadiene to maintain a predetermined desired flow rate of butadiene in said combined feed stream; and automatically controlling the flow rate of each of the remaining ones of said plurality of fluid streams responsive to the flow rate of butadiene and the one of said fourth signals corresponding to the component of said group for which the respective fluid stream is the primary source to maintain a predetermined ratio in said combined feed stream between butadiene and each of the remaining components of said group; continually analyzing the individual streams of said plurality of fluid streams which contain impurities which affect the percent conversion and continually establishing a plurality of sixth signals, each of said sixth signals being representative of the flow rate of the respective impurity in said combined feed stream; continually and automatically establishing responsive to said plurality of sixth signals a seventh signal representative of the flow rates of oxidant and activator in said combined feed stream which are the predicted requirements to achieve a predetermined desired conversion; continually and automatically manipulating the predetermined ratios in said combined feed stream between butadiene and each of activator and oxidant responsive to said seventh signal; continuously passing said combined feed stream into a polymerization zone and therein subjecting the combined feed stream to polymerization conditions; and recovering a butadiene-styrene rubber from said polymerization zone.

6. A method in accordance with claim 5 further comprising measuring the density of the effluent of said polymerization zone and establishing responsive to such measurement an eighth signal representative of the actual percent conversion at the point of measurement; and modifying said seventh signal responsive to said eighth signal to account for any discrepancies between the predicted percent conversion and the actual percent conversion.

7. A method in accordance with claim 5 further comprising measuring the density of the effluent of said polymerization zone at a point of measurement and establishing an eighth signal representative of such measurement; establishing responsive to said plurality of fourth signals a ninth signal representative of the predicted density of the effluent of said polymerization zone at said point of measurement in the absence of polymerization; establishing responsive to said eighth and ninth signals a tenth signal representative of the actual percent conversion at said point of measurement; and modifying said seventh signal responsive to said tenth signal to account for any discrepancies between the predicted percent conversion and the actual percent conversion.

8. A method in accordance with claim 5 wherein said seventh signal is determined by maintaining the ratio of $C_o$ to $C_a$ substantially constant in the following equations:

$$T_f = \sum_1^8 \frac{\psi_i C_i}{C_a} + K_1(C_o)^{N_1} (C_a)^{N_2} (C_s)^{N_3} + t_2 \quad (1)$$

wherein $T_f$ is the time required to achieve the desired final conversion;

the series 1–8 represents the following impurities [in the butadiene and styrene]; vinyl acetylene, tert butyl catechol, oxygen, butylenes, miscellaneous butadiene impurities, butadiene dimer, ethylbenzene, and miscellaneous styrene impurities;

$\psi_i$ is the inhibition loefficient for impurity $i$;

$C_i$ is the concentration of impurity $i$ in said combined feed stream;

$C_a$ is the concentration of the activator in said combined feed stream;

$C_o$ is the concentration of the oxidant in said combined feed stream;

$C_s$ is the concentration of the soap solution in said combined feed stream;

$K_1$, $N_1$, $N_2$, and $N_3$ are constants; and $t_2$ is the residence time in said polymerization zone less initial inhibition time and time required for formation of monomer/polymer particles; and $$X_t = K_2 \frac{P_M}{C_M} (C_o)^{N_4} (C_a)^{N_5} (C_s)^{N_6} +$$

$$t_3 \left[ K_3 \frac{P_M}{C_M} (C_o)^{N_7} (C_a)^{N_8} (C_s)^{N_9} - \sum_1^8 \psi_i C_i \right]$$

(2)

wherein $K_2$, $K_3$, $N_4$, $N_5$, $N_6$, $N_7$, $N_8$, and $N_9$ are constants;

$X_t$ is the conversion at a point in the reactor train subsequent to the formation of the monomer/polymer particles;

$P_M$ is the weight fraction of monomer in the particles;

$C_M$ is the concentration of the monomer in said combined feed stream;

$\psi_i$ is the retardation coefficient for impurity $i$;

$C_i$ is the concentration of impurity $i$ in said combined feed stream; and $t_3$ is the time subsequent to the formation of the monomer/polymer particles.

9. A method in accordance with claim 8 further comprising measuring the density of the effluent of said polymerization zone and establishing responsive to such measurement an eighth signal representative of the actual percent conversion at the point of measurement; and modifying at least one constant in said equations to account for any discrepancies between the predicted percent conversion and the actual percent conversion.

10. A method in accordance with claim 5 further comprising establishing an eighth signal representative of the predicted flow rate of initial modifier required to produce a butadiene-styrene rubber having a predetermined desired Mooney value; and modifying the predicted ratio in said combined feed stream between butadiene and initial modifier responsive to said eighth signal to maintain the Mooney value of the recovered butadiene-styrene rubber substantially constant at a predetermined value.

11. A method in accordance with claim 10 wherein said eighth signal is in accordance with the relationship:

$$M = K_4 + K_5 \left(\frac{C_M}{C_c R}\right)^{0.67} \left[\frac{(1-x)^{\gamma(1-R)+1}-1}{x(\gamma R-\gamma-1)}\right]^{\frac{0.67}{\gamma}} \quad (3)$$

wherein
M is Mooney;
$K_4$ and $K_5$ are constants;
$C_M$ is the concentration of monomer in the total feed to the first reactor;
$C_c$ is the concentration of the modifier in the total feed to the first reactor;
R is the apparent transfer constant;
$x$ is conversion; and
$\gamma$ is an averaging constant.

12. A method in accordance with claim 10 wherein said polymerization zone comprises a first polymerization zone and a second polymerization zone in series; further comprising adding incremental modifier to the effluent of said first polymerization zone before introducing such effluent as feed into said second polymerization zone; wherein said eighth signal is in accordance with the relationship:

$$M = K_4 + K_5 \left[\frac{\left(\frac{C_M}{C_c R}\right)^\gamma \frac{(1-x_1)^{\gamma-\gamma R+1}-1}{R\gamma-\gamma-1}}{x_2} + \frac{\left(\frac{C_M(1-x_1)^Q}{QC_c(1-x_1)^R+\Delta Q}\right)^\gamma \frac{\gamma(1-x_2)^{\gamma(1-Q)+1}-(1-x_1)^{\gamma(1-Q)+1}}{\gamma(Q-1)-1}}{x_2}\right]^{\frac{0.67}{\gamma}} + K_6 h_1 - K_7 h_2$$

wherein
$x_1$ is the conversion at the point of introduction of the incremental modifier;
Q is the apparent transfer constant after the introduction of the incremental modifier;
$\Delta$ is the modifier concentration resulting from the addition of the incremental modifier;
$x_2$ is the conversion at a point downstream of the point of addition of the incremental modifier;
$K_6$ and $K_7$ are constants; and
$h_1$ and $h_2$ are correction functions for the concentration of vinyl acetylene and butadiene dimer in the total feed to the first reactor, respectively; establishing a ninth signal representative of the predicted Mooney value of the recovered rubber; establishing a tenth signal representative of the actual Mooney value of said recovered rubber, and manipulating the rate of adding said incremental modifier responsive to the difference between corresponding values of said ninth and tenth signals.

13. A method in accordance with claim 5 wherein said polymerization zone requires a plurality of reaction zones in series; further comprising establishing an eighth signal representative of the predicted value of final percent conversion; establishing a ninth signal representative of the actual value of final percent conversion, and regulating the temperature of at least one of the final reaction zones in the series responsive to variations between corresponding values of said eighth and ninth signals to maintain the actual value of final conversion substantially constant at a predetermined value.

14. Apparatus for producing butadiene-styrene rubber which comprises means for continuously combining a plurality of fluid streams to form a combined feed stream, each of said fluid streams being a primary source of a respective one component of the group of butadiene, styrene, water, soap solution, oxidant, modifier and activator; means for continually and automatically establishing a plurality of first signals, each of said first signals being representative of the flow rate of a respective one of said plurality of fluid streams; means for continually and automatically establishing a plurality of second signals, each of said second signals being representative of the concentration of a respective one component of said group in a respective one of said plurality of fluid streams containing said respective one component of said group; means for continually and automatically establishing a plurality of third signals, each of said third signals being representative of the multiplication product of a respective one of said plurality of second signals and the corresponding one of said plurality of first signals such that each of said third signals is representative of the flow rate of a respective one component of said group in a respective one of said plurality of fluid streams which contains the respective one component of said group; means for continually and automatically establishing a plurality of fourth signals responsive to said plurality of third signals, each of said fourth signals being representative of the flow rate of a respective one component of said group in all of said plurality of fluid streams and thus in said combined feed stream; means for continually and automatically establishing a fifth signal representative of the flow rate of said combined feed stream; means for automatically controlling the flow rate of the one of said plurality of fluid streams which is the primary source of butadiene to maintain a predetermined desired flow rate of butadiene in said combined feed stream; and means for automatically controlling each of the remaining ones of said plurality of feed streams responsive to the flow rate of butadiene and the one of said fourth signals corresponding to the component of said group for which the respective stream is the primary source to maintain a predetermined ratio in said combined stream between butadiene and each of the remaining components of said group; means for continually analyzing the individual streams of said plurality of fluid streams which contain impurities which affect the percent conversion and automatically establishing a plurality of sixth signals, each of said sixth signals being representative of the flow rate of the respective impurity in said combined feed stream; means for continually and automatically establishing responsive to said plurality of sixth signals a seventh signal representative of the flow rates of oxidant and activator in said combined feed stream which are the predicted requirements to achieve a predetermined desired conversion; means for continually and automatically manipulating the predetermined ratios in said combined feed stream between butadiene and each of activator and oxidant responsive to said seventh signal; at least one polymerization reactor; means for passing said combined feed stream into said at least one polymerization reactor and therein subjecting the combined feed stream to polymerization conditions; and means for recovering a butadiene-styrene rubber from said at least one polymerization reactor.

15. Apparatus in accordance with claim 14 further comprising means for continually and automatically measuring the density of the effluent of said at least one polymerization reactor and continually and automatically establishing responsive to such measurement an eighth signal representative of the actual percent conversion at the point of measurement; and means for continually and automatically modifying said seventh signal responsive to said eighth signal to account for any discrepancies between the predicted percent conversion and the actual percent conversion.

16. Apparatus in accordance with claim 14 further comprising means for continually and automatically measuring the density of the effluent of said at least one polymerization reactor at a point of measurement and continually and automatically establishing an eighth signal representative of such measurement; means for continually and automatically establishing responsive to said plurality of fourth signals a ninth signal representative of the predicted density of the effluent of said at least one polymerization reactor at said point of measurement in the absence of polymerization means for continually and automatically establishing responsive to said eighth and ninth signals a tenth signal representative of the actual percent conversion at said point of measurement; and means for continually and automatically modifying said seventh signal responsive to said tenth signal to account for any discrepancies between the predicted percent conversion and the actual percent conversion.

References Cited

UNITED STATES PATENTS

| | | | |
|---|---|---|---|
| 3,220,998 | 11/1965 | Berger | 260—94.3 |
| 3,276,843 | 10/1966 | Cooper | 23—230 |
| 3,290,116 | 12/1966 | Carroll | 23—230 |
| 3,356,667 | 12/1967 | Smith | 260—93.7 |
| 2,872,438 | 2/1959 | Carroll et al. | 260—83.7 |
| 3,174,953 | 3/1965 | Ogle | 260—83.7 |

OTHER REFERENCES

Maher et al., Rubber Age, 59, No. 5, 557–562.
Uraneck, et al., I/EC, 47, No. 9, 1724–1729.
Frank et al., I/EC, 39, No. 7, 893–895.

JOSEPH L. SCHOFER, Primary Examiner

J. C. HAIGHT, Assistant Examiner

U.S. Cl. X.R.

23—253, 288; 137—3, 4, 88, 90, 91, 92, 93; 260—95, 698